United States Patent [19]

Hatanaka et al.

[11] Patent Number: 4,943,964

[45] Date of Patent: Jul. 24, 1990

[54] PCM SIGNAL REPRODUCING DEVICE

[75] Inventors: Yuji Hatanaka; Hiroo Okamoto, both of Yokohama; Shin-ichi Wakumura; Ichiro Miyake, both of Tokorozawa; Shunichiro Sakamoto, Kawagoe, all of Japan

[73] Assignees: Hitachi, Ltd.; Pioneer Electric Corporation, both of Tokyo, Japan

[21] Appl. No.: 228,415

[22] Filed: Aug. 5, 1988

[30] Foreign Application Priority Data

Aug. 12, 1987 [JP] Japan ................................ 62-199870
Aug. 20, 1987 [JP] Japan ................................ 62-205041

[51] Int. Cl.[5] ............................................ G06F 11/10
[52] U.S. Cl. ..................................... 371/31; 371/37.4; 371/48; 371/32
[58] Field of Search ....................... 371/5.1, 40.1, 37.4, 371/31; 360/32, 48, 49, 14.3, 8, 65, 22

[56] References Cited

U.S. PATENT DOCUMENTS

| | | | |
|---|---|---|---|
| 4,309,726 | 1/1982 | Tanaka | 360/32 |
| 4,441,184 | 4/1984 | Sonoda | 371/37.4 |
| 4,445,216 | 4/1984 | Kobari | 371/37.4 |
| 4,544,958 | 10/1985 | Odaka | 360/8 |
| 4,549,230 | 10/1985 | Odaka | 360/8 |
| 4,604,657 | 8/1986 | Fukami | 360/32 |
| 4,622,600 | 11/1986 | Okamoto | 371/48 |
| 4,685,004 | 8/1987 | Takahashi | 360/48 |
| 4,688,225 | 8/1987 | Fukami et al. | 371/37.1 |

Primary Examiner—Michael R. Fleming
Attorney, Agent, or Firm—Antonelli, Terry, Stout & Kraus

[57] ABSTRACT

PCM signals belonging to a first reproduction channel and a second reproduction channel and grouped into odd number data and even number data are previously recorded on a recording medium having a plurality of tracks in the form of frames each including at least a set of a first track and a second track. In the operation of reproducing the recorded PCM data, the PCM data reproduced by reproduction heads are stored in accordance with a first control signal, errors in the stored reproduced data are detected in accordance with a second control signal, the numbers of errors are counted, comparison is made between the error number of the odd number data and that of the even number data of the first channel and of the second channel, respectively, and the data which has been judged to include a larger number of errors are replaced by interpolated data and finally the interpolated data are mute-processed at the boundary between adjacent frames.

13 Claims, 15 Drawing Sheets

PCM SIGNAL REPRODUCING DEVICE

BACKGROUND OF THE INVENTION

The present invention relates to a device for reproducing PCM signals and more particularly to a PCM signal reproducing device which is suitable for use in an audio PCM tape recorder using rotary heads.

Previously known devices disclosed in, for example, U.S. Pat. Nos. 4,544,958, 4,549,230 and 4,688,225 are a PCM signal recording/reproducing device in which even number and odd number data are recorded on different adjacent tracks and the former half data and the latter half data on the same track are used as data corresponding to different time units. Such a device provides data with a good S/N ratio by the interpolation of data from the other track when the data corresponding to a certain track is lacking.

However, the above prior art device has a disadvantage of reproducing sound with poor sound quality. More specifically, when a high speed reproduction, such as rapid reproduction and rewinding reproduction, is carried out, PCM data in a specific reproduction area is difficult to reproduce depending upon the reproduction tape speed since a reproduction head does not precisely scan recording tracks on a tape; the data on plural tracks is simultaneously reproduced since the rotating cycle of the reproduction head does not coincide with the travelling speed of the tape; and the reproduced PCM data is discontinuous on a time base. These items will deteriorate the sound quality of reproduced sound.

SUMMARY OF THE INVENTION

An object of the present invention is to provide a PCM signal reproducing device which can provide high quality sound in the case of high speed reproduction, such as forward rapid reproduction and rewinding reproduction.

The above object of the present invention can be attained by the provision of an error number comparison circuit for comparing the error rates in individual reproduction regions, an interpolation circuit for subjecting the PCM data contained in a reproduction region with a higher error rate to interpolation using the comparison result by the error number comparison circuit, and a mute processing circuit for providing continuity to the PCM data, interpolated by the interpolation circuit.

The error number comparison circuit detects a reproduction region with a higher error rate, the interpolation circuit inhibits the output of the PCM data included in the reproduction region with a higher error rate, while selecting only the PCM data included in the reproduction region with a lower error rate, and the mute processing circuit prevents noise from being produced from discontinuous PCM data so as to provide optimum sound at any predetermined reproduction tape speed.

DESCRIPTION OF THE PREFERRED EMBODIMENTS

Figure 1:
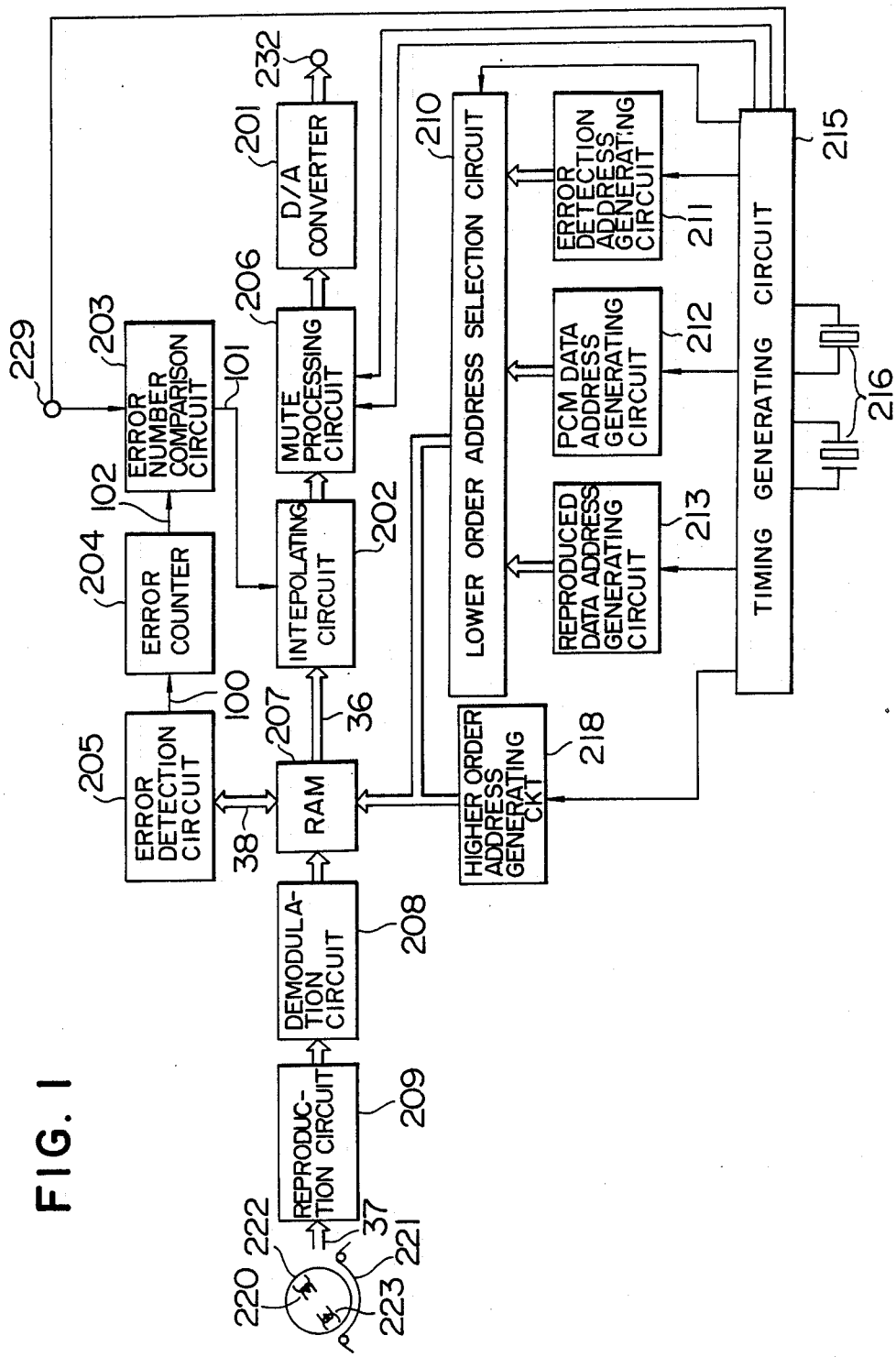
FIG. 1 is a block diagram of one embodiment of a PCM signal reproducing device according to the present invention.

Now referring to FIG. 1 showing a rotary head type PCM signal reproducing device in block form, one embodiment of the present invention will be explained. In FIG. 1, 201 is a D/A converter for converting PCM signals into analog signals; 206 is a mute processing circuit; 220 is a rotary cylinder; 221 is a magnetic tape, 222 is an A head; 223 is a B head; 209 is a reproduction circuit which performs waveform equilization and shaping; 208 is a demodulator, 207 is a RAM with a capacity of 256 K bits for temporarily storing data; 205 is an error detection circuit which corrects the errors of data stored in RAM 207 and detects the number of errors; 204 is an error counter which counts the number of the errors detected by error detection circuit 205; 203 is an error number comparison circuit for comparing the numbers of errors in each reproduction region unit; 202 is an interpolation circuit for interpolating the data judged to be not correctable and the data controlled by the error number comparison circuit 203, 218 is a higher order address generation circuit which controls the address higher order 3 (three) bits in RAM 207; 211 is an error detection address generation circuit which controls the lower order address in RAM 207 to correct the errors of data by error detection circuit 205; 212 is a PCM data address generation circuit which controls the lower order address in RAM 207 in sending the data to interpolation circuit 202; 213 is a reproduced data address generating circuit which controls the lower order address in RAM 207 in sending data from demodulation circuit 208 to RAM 207; 215 is a timing generating circuit which controls the operation timings of error detection address generating circuit 211, PCM address generating circuit 212, reproduced data address generating circuit 213, error number comparison circuit 203 and mute processing circuit 206; 210 is a lower order address selection circuit which selects the lower order addresses in RAM 207 from generating circuits 211 to 213; 216 is a quartz oscillator; 232 is an audio signal output terminal; and 229 is an input for receiving an area selection instruction from timing generating circuit 215.

Explanation will be given for the reproduction operation of the rotary head type PCM signal reproducing device shown in FIG. 1.

A signal on a magnetic tape 221 is reproduced by A head 222 and B head 223 and the reproduced signal is waveform-equalized and waveform-shaped by reproduction circuit 209. The waveform-shaped signal is demodulated by demodulation circuit 208. The demodulated data is stored in RAM 207 in accordance with a control signal from reproduced data address generating circuit 213. The stored data is read out from RAM 207 in accordance with a control signal from error detection address generating circuit 211. The read-out data is decoded to detect the number or errors included in the data by error detection circuit 205. Thereafter, the data stored in RAM 207 is read out from RAM 207 in accordance with a control signal from PCM data address generating circuit 212. The read-out data is sent to interpolation circuit 202. The data which has been judged to be not correctable in error detection circuit 205 is replaced by an interpolated data computed by the data before and after it. The interpolated data is passed through mute processing circuit 206 and converted into an analog signal by A/D converter 201. The analog signal is output from audio signal output terminal.

Figure 2:
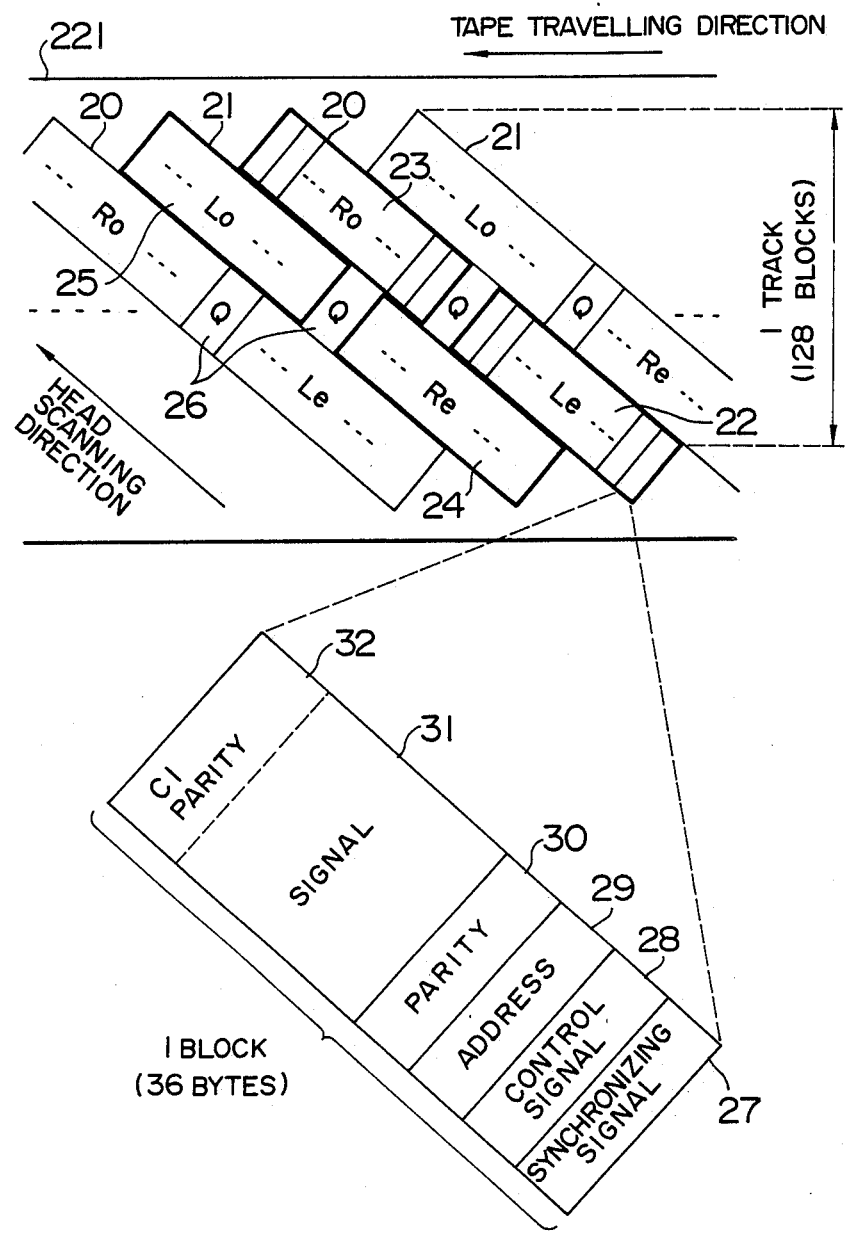
FIG. 2 is a view showing the recording format on a recording medium reproduced by a rotary head in the PCM signal reproducing device shown in FIG. 1.

FIG. 2 shows a recording format recorded on magnetic tape 221. In FIG. 2, 20 and 21 referred to as an A track and B track, respectively, are scanned by an A head 222 and B head 223 which have different azimuth angles. One track is composed of 128 blocks each constituted by 36 bytes. Arranged on the former half area 22 of A track 20 are even number data ($L_e = L_0, L_2, L_4, \ldots$) at an L channel (left channel), and arranged on the latter half area 23 of A track 20 are odd number data ($R_o = R_1, R_3, R_5, \ldots$) at an R channel (right channel). Also arranged on the former half area 24 of B track 21 are even number data ($R_e = R_0, R_2, R_4, \ldots$) at the R channel, and arranged on the latter half area 25 are odd number data ($L_o = L_1, L_3, L_5, \ldots$) at the L channel. A center portion 26 is a $C_2$ parity of a Reed Solomon code which forms a code word of 32 bytes every four blocks and is constituted by 24 blocks. This code is referred to as a $C_2$ code.

In each block 27 is a synchronization signal representative of the head of a block; 28 is a control signal indicative of a sampling frequency, a recording mode, etc.; 29 is a block address indicative of the position of the block in a track; 30 is a parity obtained by taking an exclusive OR of control signal 28 and block address 29; 31 is a PCM audio signal; 32 is a $C_1$ parity of the Reed Solomon code (referred to as $C_1$ code) provided for PCM signal 31. $C_1$ parity is located with 8 bytes on only odd number blocks.

Figure 3:
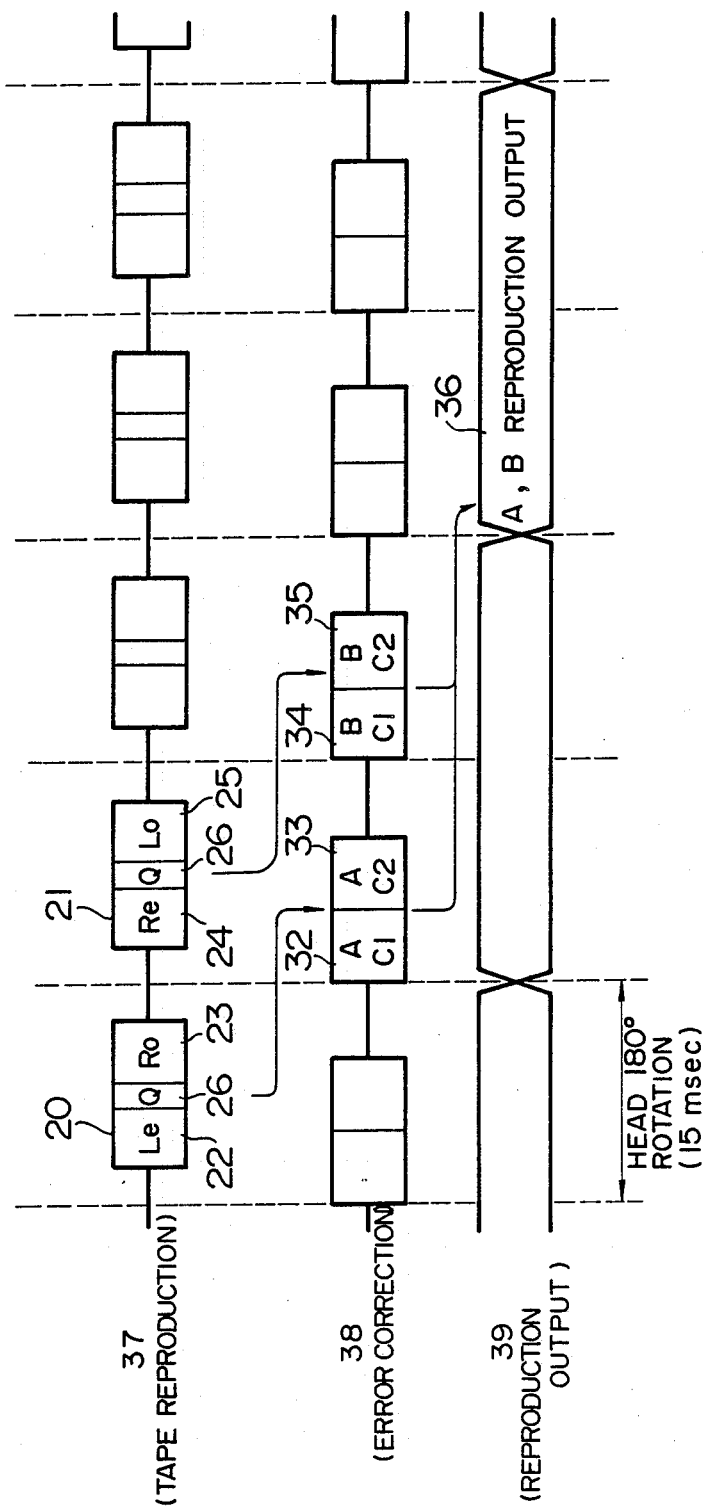
FIG. 3 is a basic timing chart of thE PCM signal device shown in FIG. 1.

FIG. 3 illustrates fundamental timings from the tape reproduction to the output of PCM audio signal. Each of the broken lines shows an interval (15 msec) during which the head rotates 180°. In FIG. 3, 37 shows reproduction timings of the PCM data from magnetic tape 221; and 39 shows output timings of PCM audio signal 31. 38 shows timings of error detection and error correction which are constituted by timings 32 and 34 of error detection (referred to as $C_1$ decode) using $C_1$ parity 32 and timings 33 and 35 of error correction (referred to as $C_2$ decode) using $C_2$ parity 26. The timings of error correction are carried out during the 180° interval following the time when the data has been read from magnetic tape 221 and the error collected data is output as an audio signal during a 360° interval 36 following the time when the error correction corresponding to two tracks has been completed.

Figure 4:
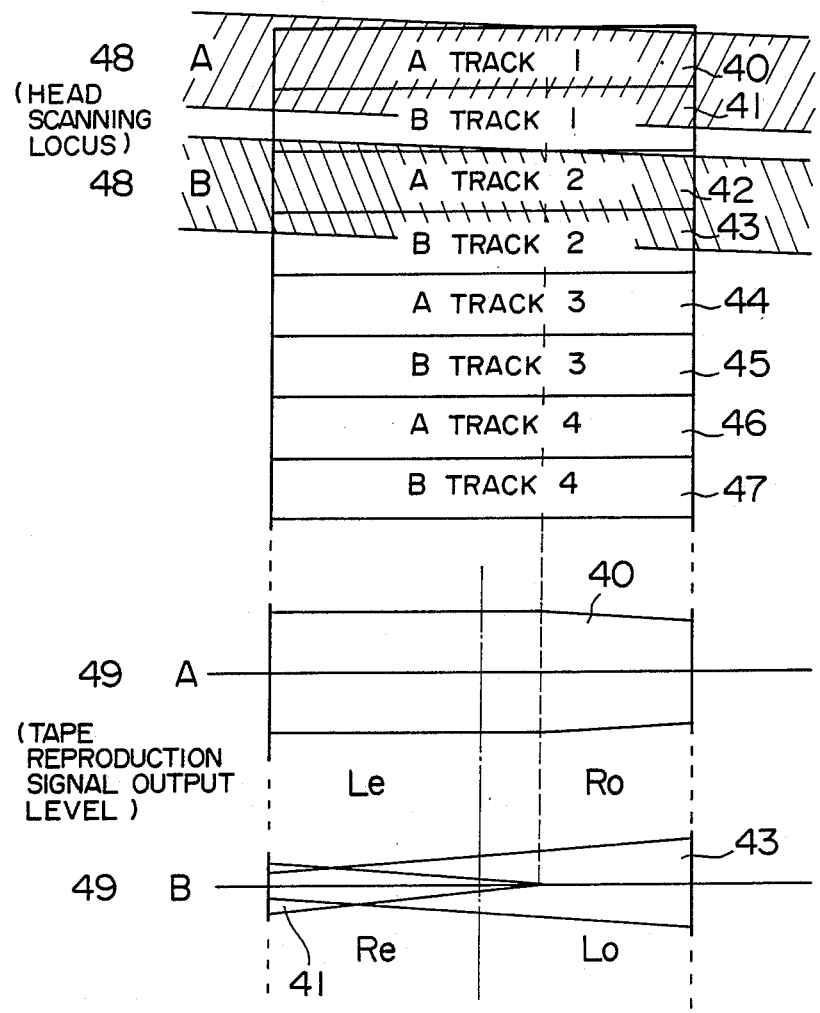
FIGS. 4, 5 and 6 show head scanning locus and a reproduced signal level at a twice rapid traverse reproduction, three-times rapid traverse reproduction and a four-times rapid traverse reproduction.
Figure 5:
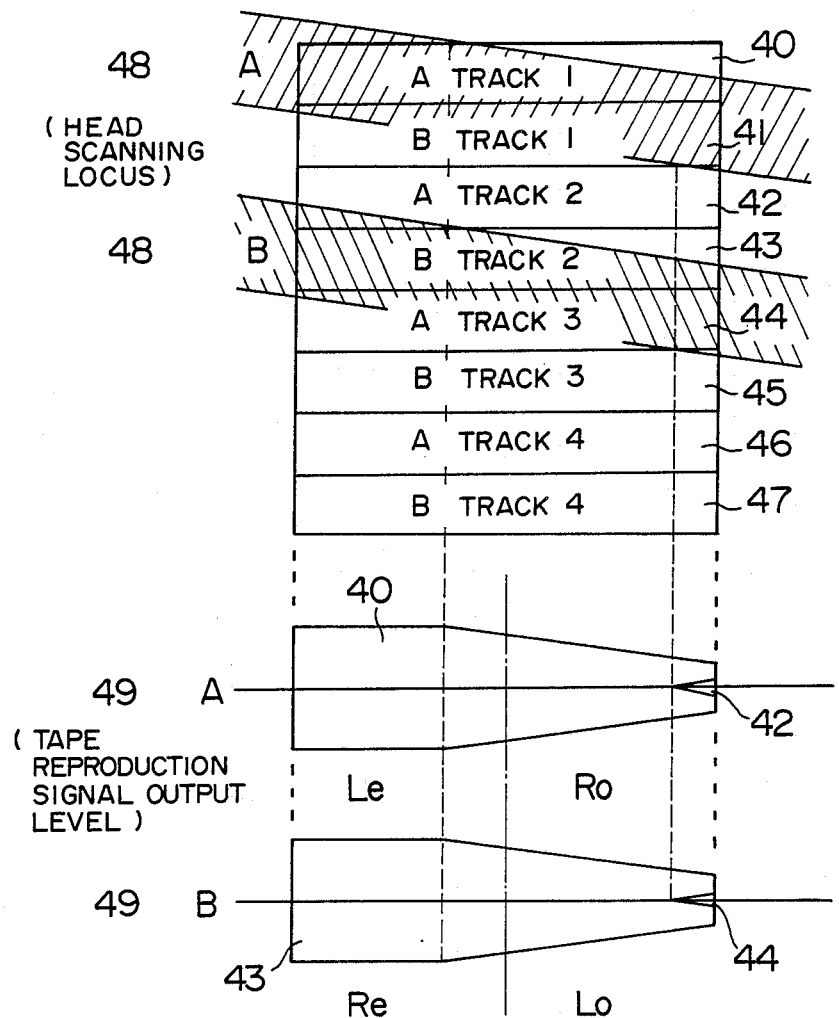
Figure 6:
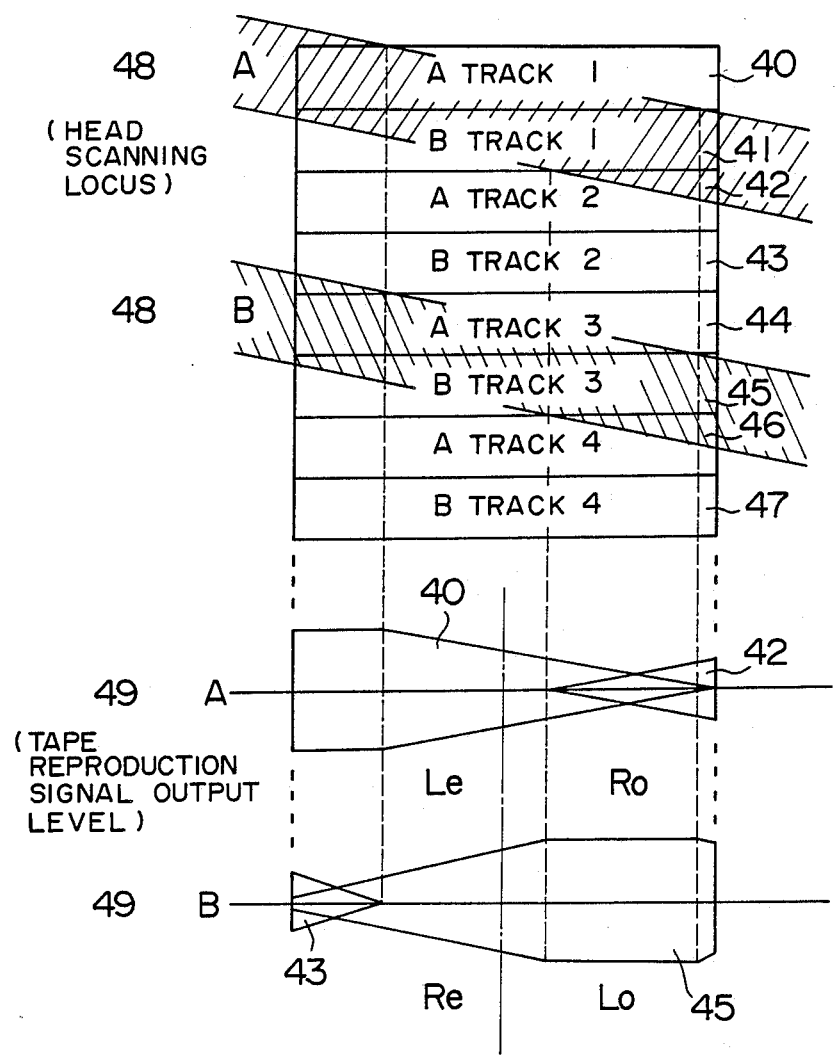

FIGS. 4 to 6 illustrate relations 48 between tracks on magnetic tape 221 during rapid traverse reproduction and scanning loci by A head 222 and B head 223, and output levels 49 of a tape reproduction signal. FIGS. 4, 5 and 6 are directed to twice, three-times and four times rapid traverse reproduction, respectively.

The head scanning loci 48 are shaded portions the upper part of which is scanned by A head 222 and the lower part of which is scanned by B head 223. The A head 222 reproduces the signal on track A but does not almost reproduce the signal on track B. The B head 223 reproduces the signal on track B but does not almost reproduce the signal on track A. As seen from FIGS. 4 to 6, during the rapid traverse reproduction, A head 222 and B head 223 do not precisely scan the corresponding tracks on the tape so that the reproduced signal at each head is the output level 49 as shown. The reproduced signal, including the former half $L_e$ and the latter half $R_o$ of the signal reproduced by A head 222 and the former half $R_e$ and the latter half $L_o$ of the signal reproduced by B head 223, is processed as in the case of normal reproduction.

In the case of twice rapid traverse reproduction, A head 222 provides a substantially good output signal level with a slight reduction thereof in the latter half of the reproduced signal, and B head 223 provides a generally low output signal level with the signals on B track 1 (41) and B track 2 (43) being mixed in the former half. In the case of three-times rapid traverse reproduction, both heads provide a reduced output signal level in the latter half. In the case of four-times rapid traverse reproduction, A head 222 and B head 223 provide a substantially good output signal level in the latter half and the former half respectively, but provide a mixed signal in the latter half and the former half, respectively.

If these signals were reproduced by the prior art device, the track interval between the even number data and the odd number data at each channel would be increased and the audio signals which belong to different times would be alternately reproduced one data by one data, which will deteriorate the reproduced sound. In order to provide high quality sound, it is necessary to prevent the odd number data and the even number data from being mixed on the time axis. This can be performed by taking, as effective data of the even number data (odd number data), only the signal reproduced from the even number data area (odd number data area) and by taking the odd number data (even number data) by interpolation of the effective even number data (odd number data) In this case, it is apparent that using, as the effective data, the signal from the desirably reproduced area rather than the poorly reproduced area provides higher quality reproduced sound. Error number comparison circuit 203 of FIG. 1 serves to select the effective data on the basis of the number of errors detected by the error detection circuit, which permits the signal reproduced from the area with a lower error rate (i.e. desirably reproduced) to be taken as effective data.

Explanation will be given for the operation of the PCM signal reproducing device in the case of the twice rapid traverse reproduction of FIG. 4.

Figure 7A:
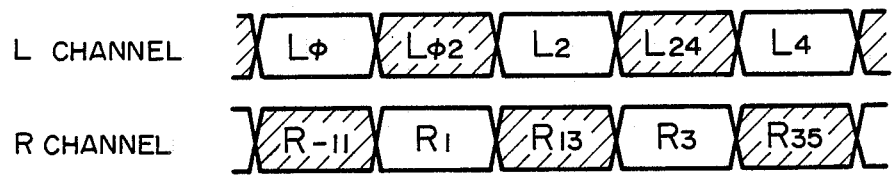
FIGS. 7A to 7C show output data at right and left channels during the rapid traverse reproductions in FIGS. 4, 5 and 6, respectively.

A track 1 (40) of FIG. 4 of magnetic tape 221 is reproduced at the timings of $L_e$ 22 and $R_o$ 23 in tape reproduction timing 37 in FIG. 3 and the reproduced signal is stored in RAM 207 through reproduction circuit 209 and demodulation circuit 208. Next, B track 1 (41) and B track 2 (43) are reproduced at the timings of $R_e$ 24 and $L_o$ of FIG. 3, and the reproduced signal is similarly stored in RAM 207. At the same time, the data error of A track 1 (40) stored in RAM is detected by error detection circuit 205 at the timing of $AC_1$ (32) and the number of the blocks which have been judged to include errors is counted by error counter 204. Then, the data in $L_e$ and $R_o$ are error-detected in the former half and the latter half, respectively. Further, the detection of data errors and the count of the number of errors relative to B track 1 (41) and B track 2 (42) are performed at the timing of $BC_1$ (34) of FIG. 3. Also in this case, $R_e$ and $L_o$ are error-detected in the former half and the latter half, respectively. Thereafter, error number comparison circuit 203 compares the error number for the former half ($L_e$) of $AC_1$ (32) with that for the latter half ($L_o$) of $BC_1$ (34), and compares the error number for the latter half ($R_o$) of $AC_1$ (32) with that for the former half ($R_e$) of $BC_1$ (34). As seen from the tape reproduction signal level 49, $R_e$ and $L_o$ provide higher error rates than $R_o$ and $L_o$, respectively. Therefore, the rate of $R_e$ and $L_o$ are produced by interpolating the data of $R_o$ and $L_e$ in interpolation circuit 202 as the timing 36 of the reproduced output as shown in FIG. 3. The output state at this time is shown in FIG. 7A. The shaded portions such as $L_{o2}$, $R_{13}$, etc. in FIG. 7A indicate the data obtained by interpolating the data occurring before and after it.

Figure 7B:
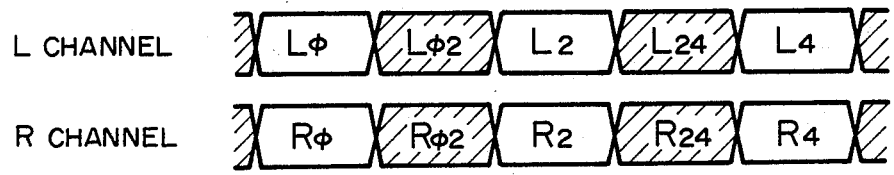
Figure 7C:
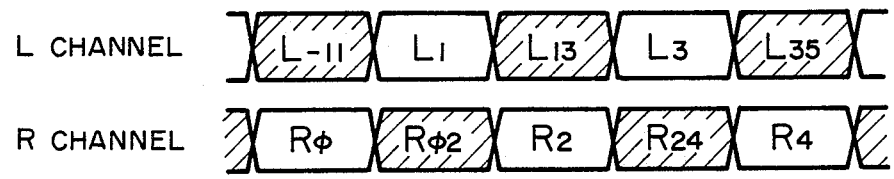

The selection of reproduced data is carried out in the similar manner in the cases of three-times and four-times rapid traverse reproduction. In the case of three-times rapid traverse reproduction, the interpolated data is odd number data at both channels since the data of $R_o$ and $L_o$ provide higher error rates. In the case of four-times rapid traverse reproduction, the interpolated data is even number data at the L channel and odd number data at the R channel, since the data of $L_e$ and $R_o$ provide higher error rates. The output states are shown in FIGS. 7B and 7C in which the shaded portions indicate the interpolated data.

As described above, in the PCM signal reproducing device of FIG. 1 only the data with a lower error rate or the even number data and the odd number data are reproduced and the data with a higher error rate can be taken as interpolated data so that the audio signals which belong to different times will not mixed and high quality sound can be always produced in accordance with any tape speed.

Figure 8:
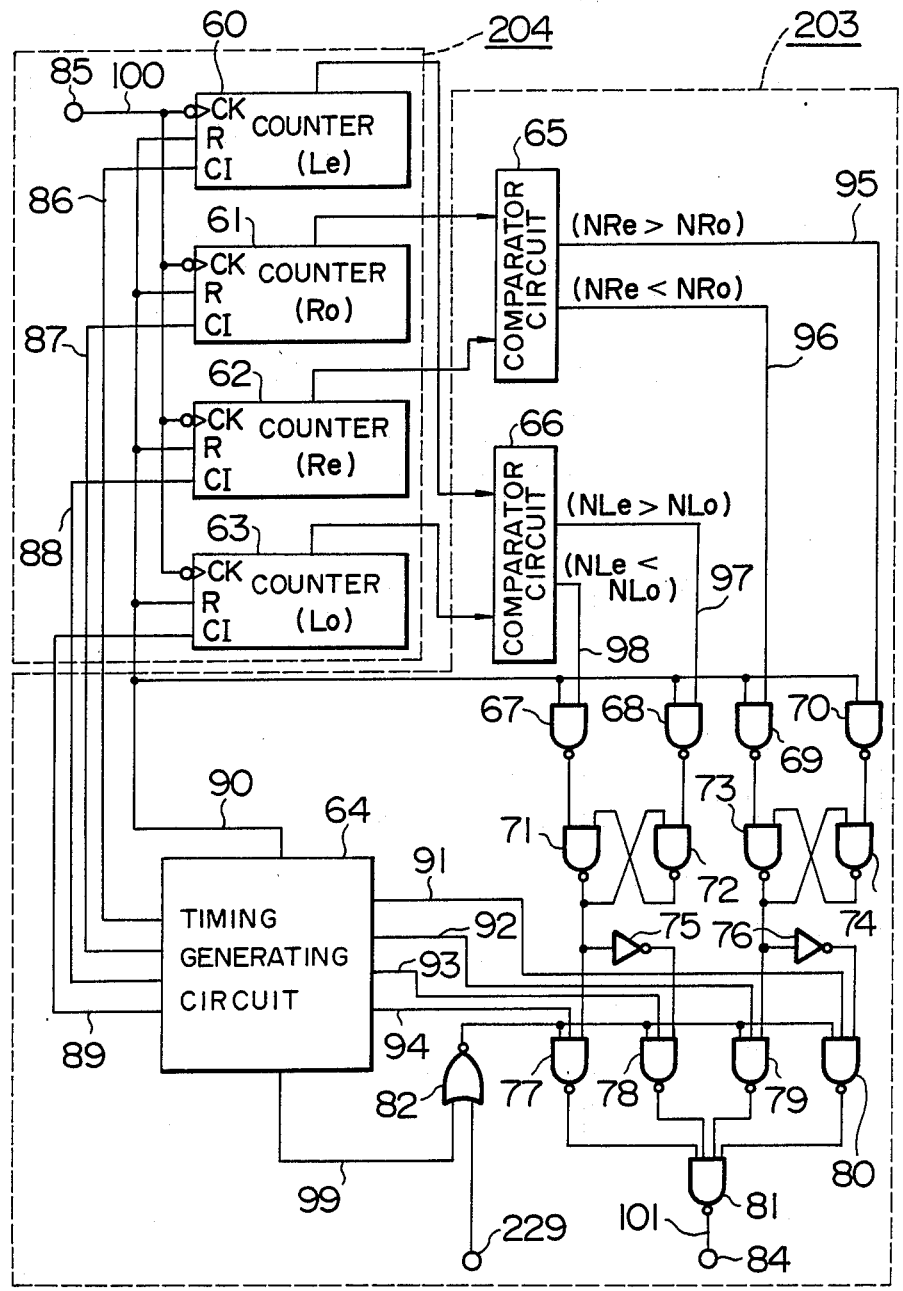
FIG. 8 is a block diagram showing an arrangement of the error counter and the error number comparison circuit in the PCM signal reproducing device shown in FIG. 1.

FIG. 8 shows an exemplary concrete arrangement of error counter 204 and error number comparison circuit 203 shown in FIG. 1. In FIG. 8, 60 to 63 are counters; 64 is a timing generating circuit; 65 and 66 are comparison circuits; 67 to 74 and 77 to 81 are NAND circuits; 75 and 76 are inverters; and 62 is a NOR circuit. 229 is an input terminal for receiving an area selection instruction from timing generating circuit 215; 84 is an output terminal for providing an interpolation instruction; 85 is an input terminal for receiving error clocks; 86 to 89 are enable signals for counters 60 to 63; 90 is a signal representative of an output timing of $L_o$ data; 95 to 98 are outputs from comparison circuits 65 and 66; 91 to 94 are signals used for the channel and the odd number/even number of the audio data; 99 is a signal representative of an output timing of the audio data; 100 is an error clock and 101 is an interpolation instruction.

Figure 9:
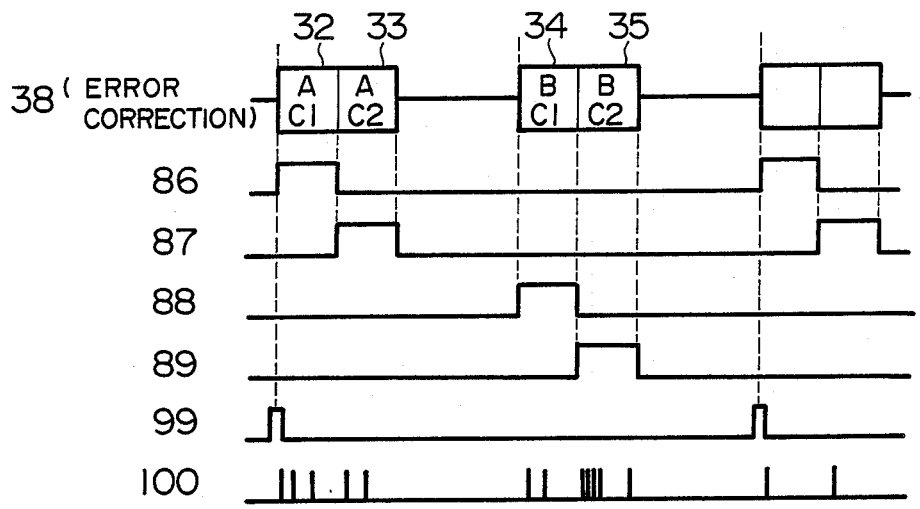
FIGS. 9 and 10 is an operation timing chart of the error number comparison circuit of FIG. 8.

FIG. 9 is a timing chart showing the relations between the respective signals 86 to 89, 99 and 100 and timings and error correction shown in FIG. 3. The period of signal 99 is equal to an interval (30 msec) during which cylinder 220 rotates 360°.

Figure 10:
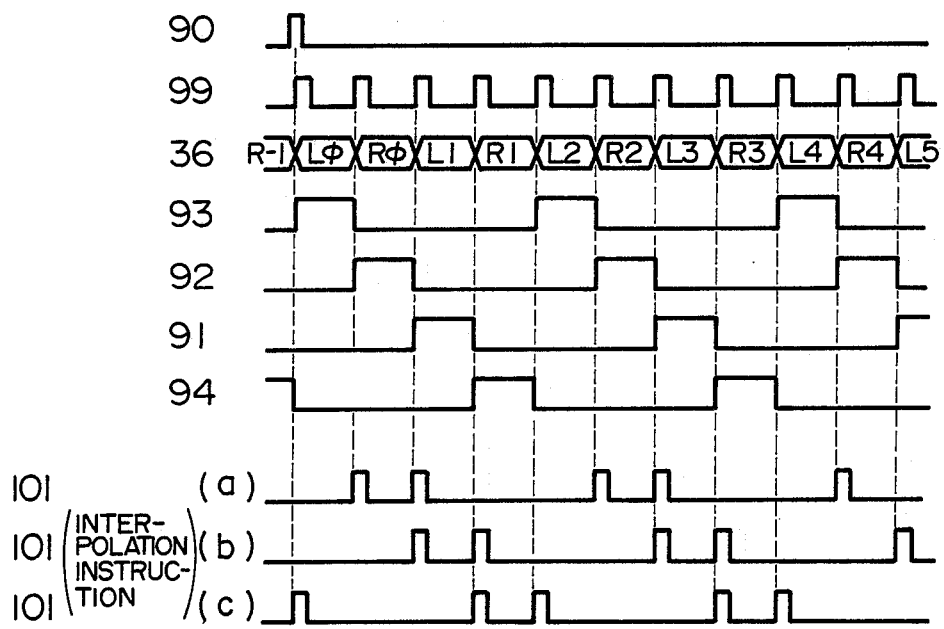

FIG. 10 is a timing chart showing the timing of respective signals 90 to 94, 99 and interpolation instruction 101. The period of signal 99 is twice as long as the sampling frequency. Interpolation instructions 101a, 101b and 101c are used in the twice, three-times and four-times rapid traverse reproduction, respectively.

With reference to FIGS. 9 and 10, the operation of error counter 204 and error number comparison circuit 205 in FIG. 8 will be explained.

An error clock 100 is input at input terminal 85 from error detection circuit 205. Since counters 60 to 63 are controlled by enable signals 86 to 89, respectively, counter 60 represents the error number for $L_e$ ($NL_e$); counter 61 represents the error number ($NR_o$) for $R_o$; counter 62 represents the error number ($NR_e$) for $R_e$; and counter 63 represents the error number ($NL_o$) for $L_o$. These counting results are compared in comparison circuits 65 and 66. More specifically, $NR_o$ and $NR_e$ are compared in comparison circuit 65 and $NL_e$ and $NL_o$ are compared in comparison circuit 66. Then, if $NR_e > NR_o$, output 95 is at a high level and if $NR_e < NR_o$, output 96 is a high level. Also, if $NL_e > NL_o$, output 97 is at a high level and if $NL_e < NL_o$, output 98 is at a high level. These outputs 95 to 98 are gated using signal 90 and latched by R-S flip-flops 71 to 74, so that they will be held during the succeeding 360° interval. Now, if a low level signal is input at input terminal 229 receiving an area selection instruction from timing generating circuit 215, an interpolation instruction in accordance with the state of output signals 95 to 98 is output from output terminal 84 to interpolation circuit 202. When interpolation instruction 101 is at a high level, the interpolation is carried out in interpolation circuit 202, and thus the PCM audio signals as shown in FIGS. 7A to 7C can be produced.

Assuming that the outputs from comparison circuits 65 and 66 are at a low level when $NL_e = NL_o$ or $NR_e = NR_o$, the immediately previous comparison results remain held in R-S flip-flops 71 to 74, so that the reproduction areas to be selected are not changed.

Figure 11:
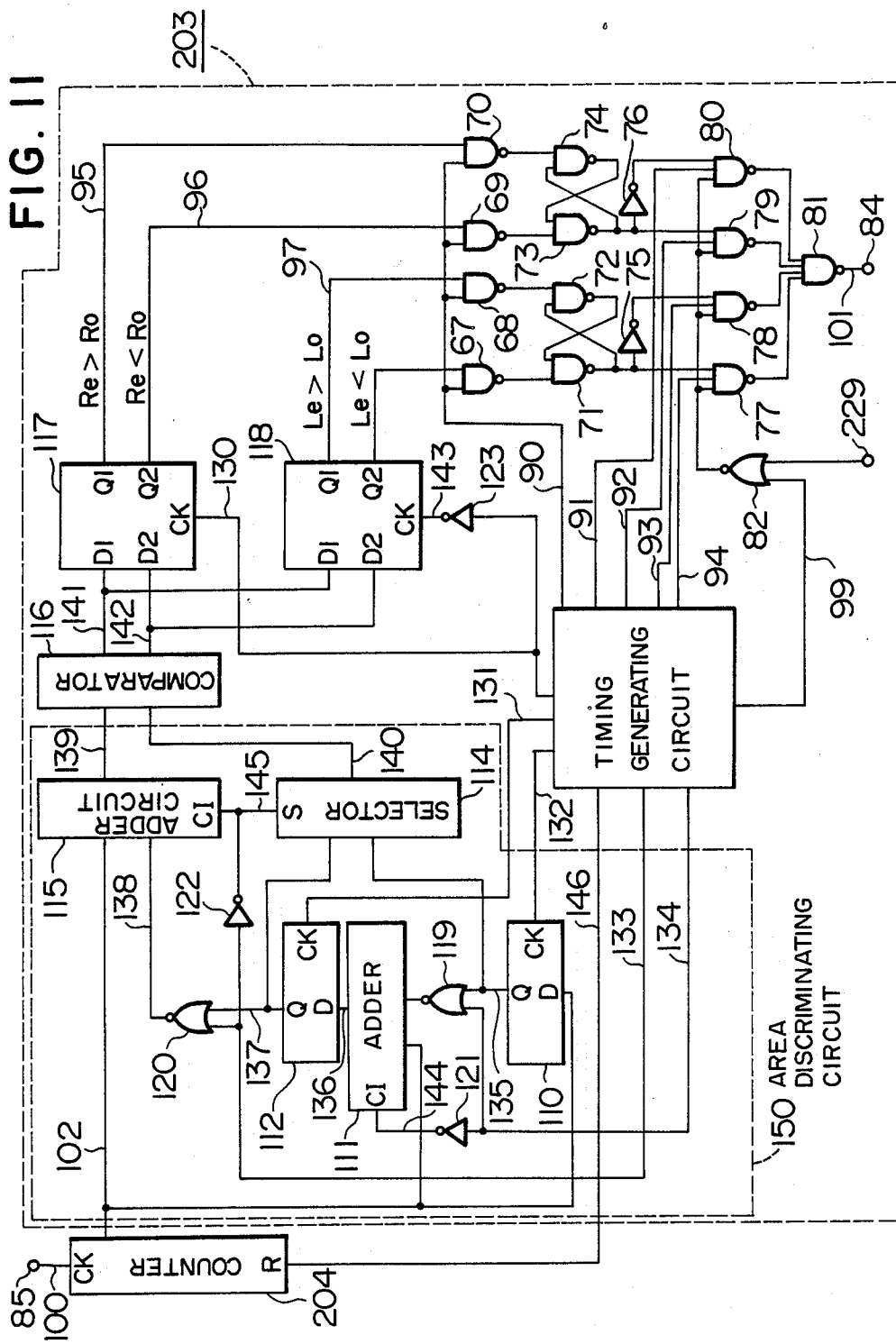
FIG. 11 is a block diagram showing the other arrangement of the error counter and the error number comparison circuit shown in FIG. 1.

FIG. 11 shows another arrangement of error-counter 204 and error number comparison circuit 203, in which only one error counter is used. In FIG. 11, 204 is a 7 bit counter; 110, 112, 117 and 118 are latch counters (falling clock); 111 and 115 are adder circuits; 114 is a selection circuit; 116 is a comparison circuit; 113 is a timing generating circuit; 119 and 120 are NOR circuits, and 121 to 123 are inverters.

Figure 12:
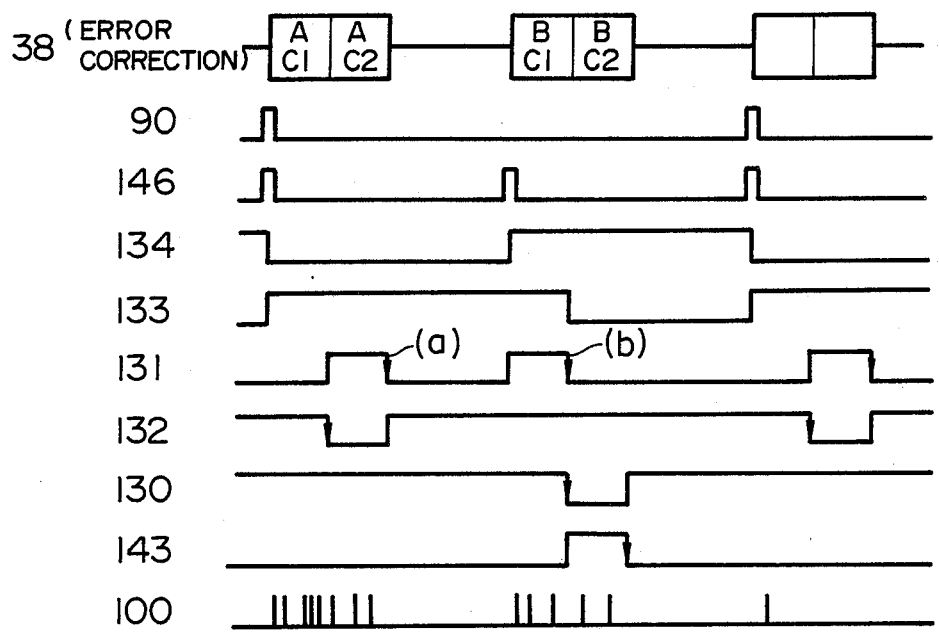
FIG. 12 is an operation timing chart of the error number comparison circuit of FIG. 11.

FIG. 12 is a timing chart of error number comparison operations in error number comparison circuit 203 in FIG. 11. The operation of circuit 203 will be explained with reference to FIG. 12.

Counter 204 is started to operate by error clock 100. The error number $NL_e$ for the reproduction area of $L_e$ is held in latch circuit 110. Then, signal 134 is at a low level so that an output from NOR 119 is an invention of the signal indicative of $NL_e$. Signal 144 is at a high level so that an output 136 from adder circuit 111 is an output from counter 204 minus $NL_e$. This value is held in latch 112 using clock 131 (a) so that signal 127 is $NR_o$. Thereafter, counter 204 is reset using a reset signal 146 and the counting operation in counter 204 is started again by error clock 100. Then, output 133 is at a high level and output 145 is at a low level so that signal 102 passes through adder circuit 115 as it is and is input to comparison circuit 116. On the other hand, selection circuit 114 selects output 137 so that the other input to comparison circuit 116 is $NR_o$. Outputs 141 and 142 from comparison circuit are held in latch circuit 117 using clock 130 so that outputs 95 and 96 represent the comparison results between $NR_e$ and $NR_o$. At this time, signal 124 is at a high level and signal 144 is at a low level so that output 102 from counter 204 passes through adder circuit 111 and is held in latch circuit 112 by a clock 131 (b). Thus, output 137 is $NR_e$. Next, signal 133 is at a low level and signal 145 is at a high level so that output 139 from adder circuit 115 is the output 102 from counter 204 minus $NR_e$. On the other hand, selection circuit 114 selects output 135 so that $NL_e$ is input to comparison circuit 116. Thus, the comparison result between $NL_e$ and $NL_o$ is held in latch circuit 118 by a clock 143. Thereafter, interpolation instruction 101 is output in the manner 35 as described above in accordance with the timing chart of FIG. 10. Additionally, the main circuits constituting an area discrimination circuit 150 are adder circuits 111, 115, latch circuits 110, 112 and selection circuit 114.

If, in comparing the error numbers, only the high order bit side outputs, but not the entire outputs from error counter 204, are compared, the number of bits in comparison circuits 65, 66 (FIG. 8), and adder circuits 111, 115, latch circuits 110, 112 (FIG. 11), etc. can be reduced, thereby reducing the circuit scale of error number comparison circuit 202.

In the above explanation, the selection of even number data or odd number data as effective data has been made with a period of two tracks (30 msec). However, it is possible to make the selection with a longer period than two tracks and further lengthen the period of exchanging even number data and odd number data by providing a hysterisis to the comparison result.

Figure 13:
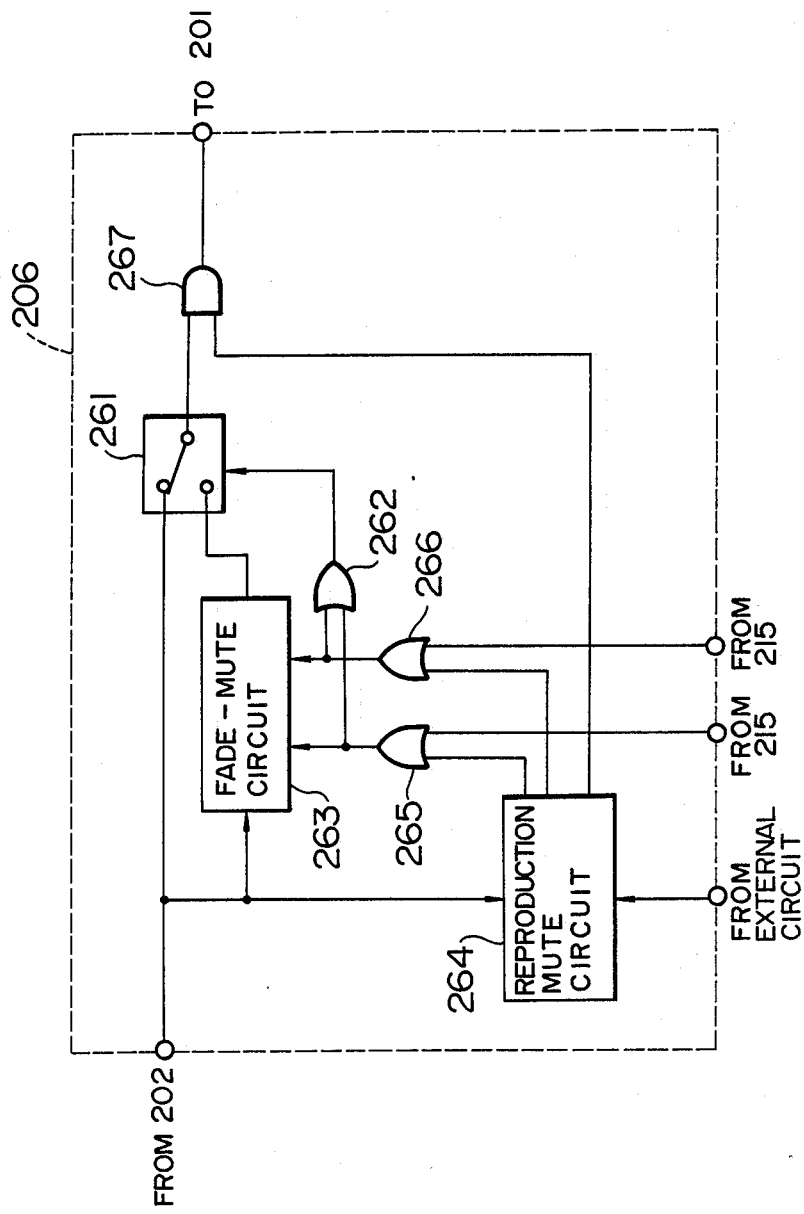
FIG. 13 is a block diagram showing an arrangement of the mute processing circuit in the PCM signal reproducing device shown in FIG. 7.

FIG. 13 shows a mute processing circuit 206 for interpolated data. Mute processing circuit 206 includes a fade-mute processing circuit 363 which mainly operates during variable speed reproduction, and a reproduction mute circuit 264 which operates during normal reproduction.

The fade-mute operation in mute processing circuit 206 during variable speed reproduction will be explained.

First, a data selector 261 selects an output from fade-mute processing circuit 263 during the period when an output from an OR gate 262 is at a high potential level, and selects data from interpolation circuit 202 during the period when the output from OR gate 262 is at a low potential level. Thus, during the period when a fade-mute-on signal, applied to one input of OR gate 262 from timing generating circuit 215 through an OR gate 265, is at a high potential level and during the period when a fade-mute-off signal, applied to the other input of OR gate 262 from timing generating circuit 215 through an OR gate 266, is at a high potential level, data selector 261 selects the output from fade-mute processing circuit 263.

Explanation will be given for the operation of fade-mute processing circuit 263 during the period when the fade-mute-on signal, applied to fade-mute processing circuit 263 from timing generating circuit 215 through OR gate 265 is at a high potential level.

Now, the digital data reproduced immediately after the fade-mute-on signal has risen is referred to as $PD_{(i)}$ and the audio data obtained by fade-mute-processing $PD_{(i)}$ is referred to as $AD_{(i)}$. The fade-mute-level is referred to as X (X<1). The fade-mute-on operation in fade-mute processing circuit 263 can be represented in the following equations (1) to (6)

$$AD_{(i)} = X \cdot PD_{(i)} \qquad (1)$$
$$AD_{(i+1)} = X^2 \cdot PD_{(i+1)} \qquad (2)$$
$$AD_{(i+2)} = X^3 \cdot PD_{(i+2)} \qquad (3)$$
$$\vdots$$
$$AD_{(i+k)} = X^{(k+1)} \cdot PD_{(i+k)} \qquad (4)$$
$$AD_{(i+k+1)} = 0 \qquad (5)$$
$$AD_{(i+k+2)} = 0 \qquad (6)$$
$$\vdots$$

Figure 15:
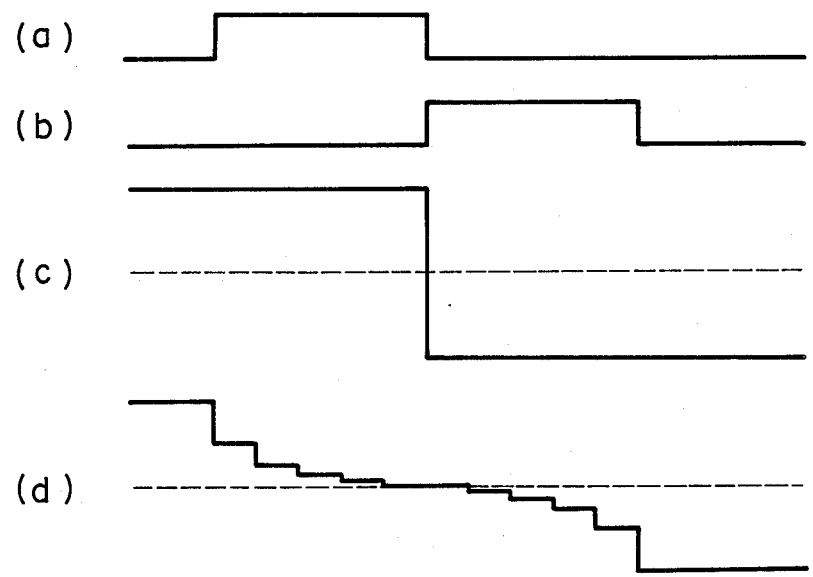
FIGS. 15($a$) to 15($d$) show the details of analog signal waveform obtained when interpolation data is fade-mute-processed by the mute processing circuit of FIG. 13.

First, the multiplication of data $PD_{(i)}$ by constant X (X<1) is made to provide audio data $AD_{(i)}$ (Equation (1)). Since the reproduced digital data subsequent to data $PD_{(i)}$ is $PD_{(i+1)}$, the multiplication of $PD_{(i+1)}$ by $X^2$ is made to provide the audio data $AD_{(i+1)}$ subsequent to the audio data $AD_{(i)}$. Likewise, the multiplication of $PD_{(i+2)}$ by $X^3$ is made to provide $AD_{(i+2)}$. Thus, the multiplication of $PD_{(i+k)}$ by $X^{(k+1)}$ is made to provide audio data $AD_{(i+k)}$, as expressed in Equation (4), which approximates zero (0). Further, if k is set to a suitable value so that all the data following the data $AD_{(i+k)}$ is zero, the analog signal waveform as shown in FIG. 15(d) is produced during the duration of the fade-mute-on signal shown in FIG. 15(a). FIG. 15(c) shows the analog signal wave obtained when the interpolated data is not mute processed.

Explanation will be given for the operation of fade-mute processing circuit 263 during the period when the fade-mute-off signal, applied to fade-mute processing circuit 263 from timing generating circuit 215 through OR gate 266, is at a high potential level.

Now, the digital data reproduced immediately after the fade-mute-off has risen is referred to as $PD_{(j)}$ and the audio data obtained by fade-mute-processing $PD_{(j)}$ is referred to as $AD_{(j)}$. The fade-mute-on processing circuit 263 can be represented in the following equations (7) to (12).

$$AD_{(j)} = X^{k+1} \cdot PD_{(j)} \qquad (7)$$
$$AD_{(j+1)} = X^k \cdot PD_{(j+1)} \qquad (8)$$
$$AD_{(j+2)} = X^{(k-1)} \cdot PD_{(j+2)} \qquad (9)$$
$$\vdots$$
$$AD_{(j+k)} = X \cdot PD_{(j+k)} \qquad (10)$$
$$AD_{(j+k+1)} = PD_{(j+k+1)} \qquad (11)$$
$$AD_{(j+k+2)} = PD_{(j+k+2)} \qquad (12)$$

First, the multiplication of data $PD_{(j)}$ by constant $X^{(k+1)}$ is made to provide audio data $AD_{(j)}$ (Equation (7)). Since the reproduced digital data subsequent to data $PD_{(j)}$ is $PD_{(j+1)}$, the multiplication of $PD_{(j+1)}$ by $X^k$ is made to provide the audio data $AD_{(j+1)}$ subsequent to the audio data $AD_{(j)}$, as expressed in Equation (8). Like processings are made to provide $AD_{(j+2)}$ as expressed in Equation (9), and $AD_{(j+k)}$ as expressed in Equation (10). Further, the process of substituting the reproduced digital data for all the data following to the data $ad_{(j+k)}$, with K set to a suitable value, provides audio data $AD_{(j+k+1)}$ expressed in Equation (11). In this manner, the analog signal waveform as illustrated FIG. 15(d) is produced during the duration of the fade mute-off signal shown in FIG. 15(b).

FIG. 15(d), as a whole, shows the result of the D/A conversion of the audio data subjected to the fade-mute-processing in the case of K=3 and X=0.5. As seen from FIG. 15(d), analog audio data continuous at a zero level can be obtained during successive periods of fade-mute-on and fade-mute-off in place of the discontinuous analog audio signal shown in FIG. 15(c).

Figure 14:
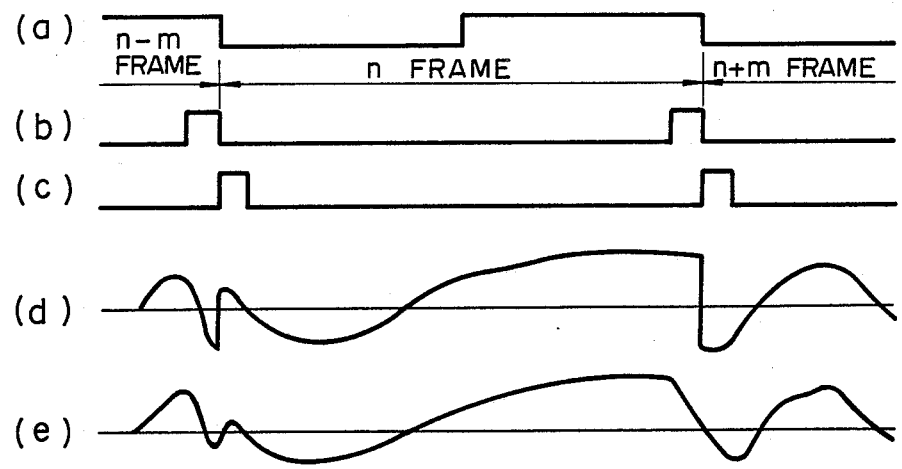
FIGS. 14($a$) to 14($e$) show waveforms obtained when interpolation data is fade-mute-processed and not fade-mute processed by the mute processing circuit of FIG. 13.

The actual fade-mute processing is obtained as follows. Now it is assumed that the waveform obtained by converting the data input from interpolation circuit 202 is as shown in FIG. 14(d). If the frame during the variable speed reproduction is not continuous at the boundary between the frames as shown in FIG. 14(a), the fade-mute-on signal and the fade-mute-off signal are switched by timing generating circuit 215 as shown in FIGS. 14(b) and 14(d). Then, fade-mute processing circuit 263 is operated for the input data in the manner as mentioned above. Thus, the input data can be converted into an analog signal continuous at the zero level at the boundary between the frames, as shown in FIG. 14(e). Additionally, in the above explanation, the level has been changed for one data unit, but it may be changed for plural data units, e.g. four data units.

Figure 16:
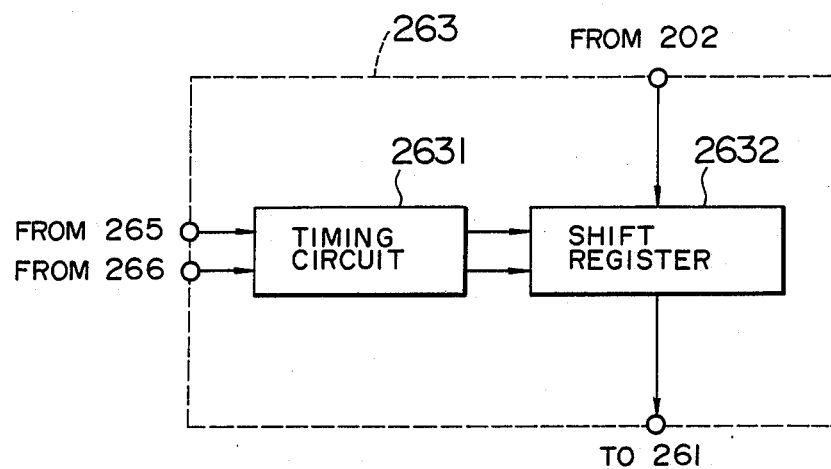
FIG. 16 shows an arrangement of a fade-mute processing circuit constituting the mute processing circuit of FIG. 13.

FIG. 16 shows an example of the arrangement of fade-mute-processing 263 in the case of X=0.5. In the case of X=0.5 as in FIG. 16, fade-mute-processing circuit 263 can be easily constituted by a timing circuit 2631 and a shift register 2632. Timing circuit 2631 have two input terminals for receiving the fade-mute-on signal from OR gate circuit 265 and the fade-mute-off signal from OR gate circuit 266. Shift register 2632 has an output terminal for sending the fade-mute-processed data to data selector 261 and an input terminal for receiving the interpolated data from interpolation circuit 202.

Figure 17:
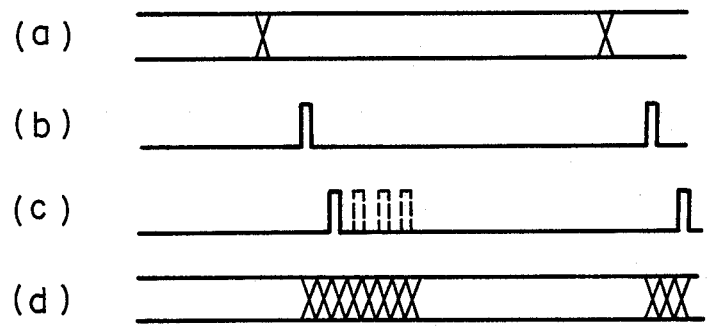
FIGS. 17($a$) to 17($d$) are operation timing charts of the fade-mute processing circuit of FIG. 16.

The operation of fade-mute-processing circuit 263 of FIG. 16 will be explained in accordance with a timing chart of FIG. 17. Data is input at the timing of FIG. 17(a) from interpolation circuit 202 to shift register 2632. Timing circuit 2631 creates a load signal for shift register 2632 at the timing of FIG. 17(b) to load the input data in shift register 2632. Timing circuit 2631 also creates a shift clock for shift register 2632 at the timing of FIG. 17(c) to shift the data loaded in shift register 2632. The number of shift clocks is controlled in accordance with Equations (1) to (10) described above. Namely, if the number of shift clocks is k, the data is multiplied by $(0.5)^k$. Thus, the fade-mute-processed data is sent at the timing of FIG. 17(d) from shift register 2632 to data selector 261.

Figure 18:
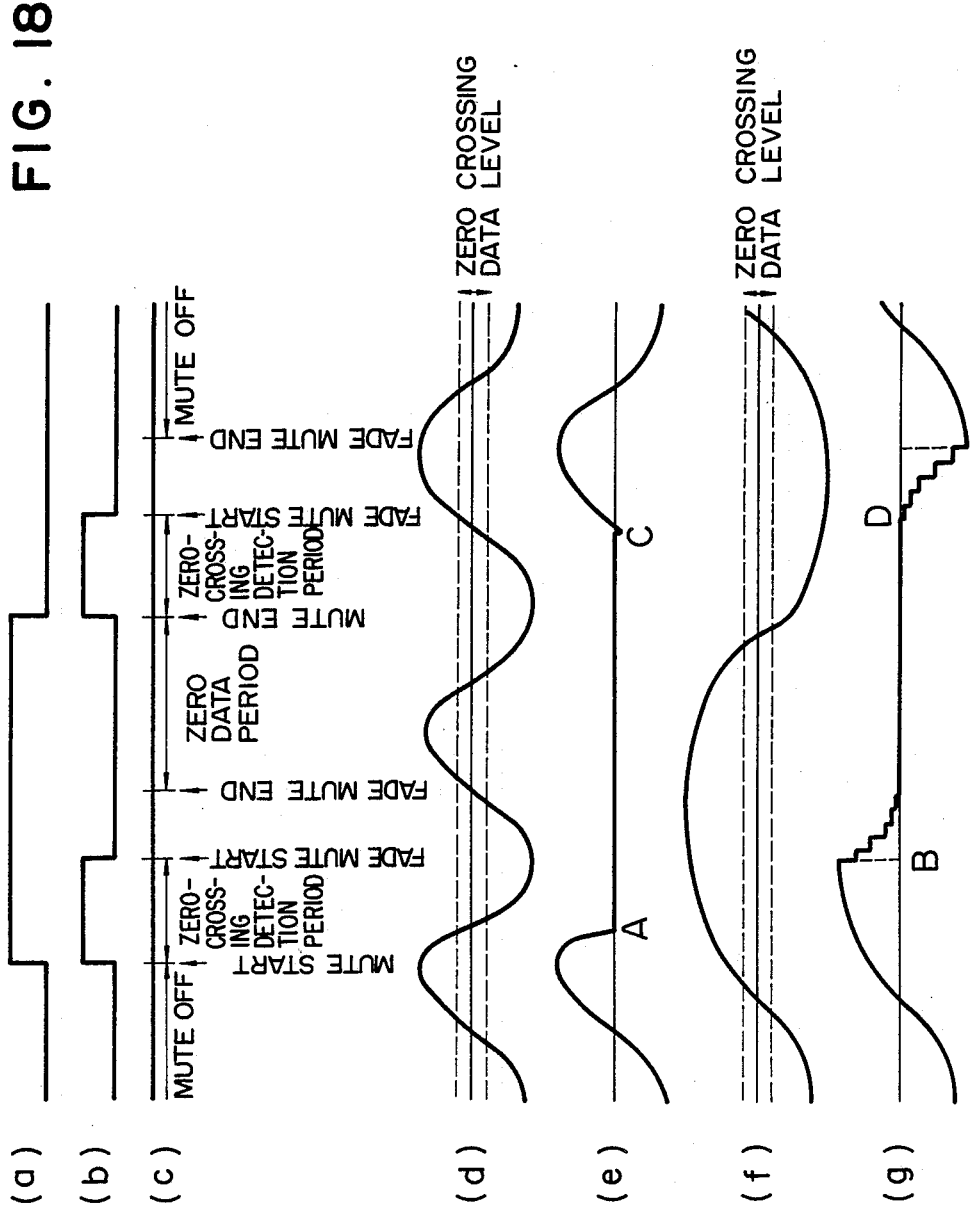
FIGS. 18($a$) to 18($g$) show analog signal waveforms mute-processed and fade-mute-processed by the mute processing circuit of FIG. 13 when a recording medium is reproduced by the PCM signal reproducing device at a normal speed.

The mute operation during the normal speed will be explained with reference to FIGS. 13 and 18. Reproduction mute circuit 264, when having received a reproduction mute control signal (FIG. 18(a)), detects, during the period when zero crossing data is to be detected, if the input data from interpolation circuit 202 contains zero crossing data. If zero crossing data is detected during the detection period, a detection signal is applied to AND circuit 267. More specifically, reproduction mute processing circuit 264 supplies a high level input to AND circuit 267 for mute order and a low level input to AND circuit 267 for mute release.

Fade-mute-processing circuit 263 performs a fade-mute-operation upon receipt of a fade-starting signal sent from reproduction mute circuit 264 at the end of the zero crossing data detection time when the zero crossing data has not been detected during the detection period. Fade-mute-processing circuit 263 performs the same operation as the circuit of FIG. 15.

FIGS. 18(d) and 18(e) show input data and output data when the zero-crossing data could be detected during the zero-crossing detection period, respectively, and FIGS. 18(f) and 18(g) show input data and output data when the zero-crossing data could not be detected during that period, respectively.

We claim:
1. A PCM signal reproducing device for reproducing a recording medium having reproduction heads and a plurality of tracks, at least a set of a first and a second track forming one frame, on which PCM data of a first and a second channel respectively divided into odd number data and even number data are recorded, said device comprising:
   a signal processing circuit including:
   a memory circuit for storing the PCM data reproduced from the reproduction heads;
   an error detection circuit for detecting errors of the PCM data stored by said memory circuit;
   an error count circuit for counting the number of errors detected by said error detection circuit;
   an error comparison circuit for comparing the errors of the odd number data and the even number data of the first and second channels; and
   an interpolating circuit connected to receive the PCM data from said memory circuit and replacing with interpolating data the data which is decided to have a larger number of errors in accordance with the comparison.

2. A reproducing device according to claim 1 in which said error count circuit includes:
   a first counter counting the number of errors of odd number data of the first channel which is detected by said error detection circuit;
   a second counter counting the number of errors of even number data of the first channel which is detected by said error detection circuit;
   a third counter counting the number of errors of odd number data of the second channel which is detected by said error detection circuit; and
   a fourth counter counting the number of errors of even number data of the second channel which is detected by said error detection circuit.

3. A reproducing device according to claim 2 in which said error comparison circuit includes:
   a first comparator comparing the number of errors of said first counter with that of said second counter;

a second comparator comparing the number of errors of said third counter with that of said fourth counter; and an interpolating command generation circuit responsive to an area selection command from a timing forming circuit for generating an interpolating command in accordance with the comparison result of said first and second comparators.

4. A reproducing device according to claim 1 in which said error count circuit includes a single counter selectively counting the number of errors of odd number and even number data of the first and second channels which are respectively detected by said error detection circuit.

5. A reproducing device according to claim 4 in which said error comparison circuit includes:

an area discrimination circuit sequentially discriminating from the number of errors counted by said single counter those of the odd number data and even number data of the first and second channels;

a single comparison circuit comparing the number of errors of odd number data of the first channel with that of even number data thereof and comparing the number of errors of odd number data of the second channel with that of even number data thereof, which are respectively discriminated by said area discrimination circuit; and an interpolating command generation circuit responsive to an area selection command from a timing forming circuit for generating an interpolating command in accordance with the comparison result of said single comparison circuit.

6. A PCM signal reproducing device for reproducing a recording medium having a plurality of tracks, at least a set of a first and a second track forming one frame, on which PCM data of a first and a second channel respectively divided into odd number data and even number data are recorded, said device comprising:

a signal processing circuit for storing the PCM data reproduced by reproduction heads, detecting errors of the stored reproduction data, counting the detected errors, comparing with each other the counted errors of the odd number data and even number data of the first and second channels, and in response to the comparison, replacing with interpolated data the data which is decided to have the larger number of errors; and a mute processing circuit for selectively mute processing the PCM data processed by said signal processing circuit in accordance with a fade-mute-on signal and a fade-mute-off signal respectively applied thereto.

7. A reproducing device according to claim 6, said signal processing circuit includes:

a memory circuit for storing the PCM data reproduced from the reproduction heads;

an error detection circuit for detecting errors of the PCM data stored by said memory circuit;

an error count circuit for counting the number of errors detected by said error detection circuit;

an error comparison circuit for comparing with each other the errors of the odd number data and the even number data of the first and second channels; and an interpolating circuit receiving the PCM data from said memory circuit and replacing with interpolating data the data which is decided to have a larger number of errors in accordance with the comparison.

8. A reproducing device according to claim 6 in which said mute processing circuit includes:

a data selector selecting a fade mute processing in response to the fade-mute-on signal and the face-mute-off signal from a timing forming circuit when said recording medium is reproduced with a predetermined high reproduction speed; and a fade mute circuit for mute processing the data processed by said signal processing circuit at the boundary between adjacent frames when said data selector selects the face mute processing.

9. A PCM signal reproducing device for reproducing a recording medium having magnetic heads and a plurality of tracks, at least a set of first and second tracks forming one frame, on which PCM data of a first channel and a second channel, respectively, divided into off number data and even number data recorded, said device comprising:

a signal processing circuit for signal-processing PCM data reproduced by said heads;

a mute processing circuit for selectively mute processing the PCM data processed by said signal processing circuit in accordance with a face-mute-on signal and a fade-mute-off signal respectively applied thereto, said mute processing circuit including;

(a) a data selector selecting a fade mute processing in response to the fade-mute-on signal and the fade-mute-off signal from a timing forming circuit when said recording medium is reproduced with a predetermined high reproduction speed; and (b) a fade mute circuit for mute processing and data processed by said signal processing circuit at the boundary between adjacent frames when said selector selects a fade mute processing.

10. A reproducing device according to claim 9 in which said fade mute circuit performs the face-mute processing in response to the fade-mute-on signal and the fade-mute-off signal in accordance with following equations.

$$AD_{(i)} = X \cdot PD_{(i)}$$
$$AD_{(i+1)} = X^2 \cdot PD_{(i+1)}$$
$$AD_{(i+2)} = X^3 \cdot PD_{(i+2)}$$

$$AD_{(i+k)} = X^{(k+1)} \cdot PD_{(i+k)}$$
$$AD_{(i+k+1)} = 0$$
$$AD_{(i+k+2)} = 0$$
$$AD_{(j)} = X^{k+1} \cdot PD_{(j)}$$
$$AD_{(j+1)} = X^k \cdot PD_{(j+1)}$$
$$AD_{(j+2)} = X^{(k-1)} \cdot PD_{(j+2)}$$

$$AD_{(j+k)} = X \cdot PD_{(j+k)}$$
$$AD_{(j+k+1)} = PD_{(j+k+1)}$$
$$AD_{(j+k+2)} = PD_{(j+k+2)}$$

where $PD_{(i)}$ defines a reproduction digital data immediately after rise of the fade-mute-on signal, $AD_{(i)}$ an audio data fade-mute processed, $X$ ($X<1$) a fade mute level, $PD_{(j)}$ a reproduction digital data immediately after rise of the fade-mute-off signal, and $AD_{(j)}$ an audio data fade-mute processed.

11. A reproducing device according to claim 10 in which said fade mute circuit has the fade mute level of $X = \frac{1}{2}$.

12. A reproducing device according to claim 9 in which said mute processing circuit further includes:
a reproducing mute circuit responsive to a control mute signal from an outer circuit for detecting whether or not zero cross data exists in the data processed by said signal processing circuit when said recording medium is reproduced with an ordinary reproduction speed, and for producing zero data when the zero cross data is detected during a zero cross detection period, and for providing the fade-mute-on signal and the fade-mute-off signal to said mute circuit at the completion of said zero cross detection period when the zero cross data is not detected.

13. A reproducing device according to claim 9 in which said fade mute circuit includes:
a timing circuit responsive to the fade-mute-on signal and the fade-mute-off signal for generating a load signal in a predetermined timing, and;
a shift register responsive to the load signal from said timing circuit for shifting with a predetermined multiple the data from said signal processing circuit from the period of the fade-mute-on signal to the period of the fade-mute-off signal subsequent thereto.

* * * * *